Oct. 8, 1946.  F. H. McELROY  2,408,988
CENTRIFUGAL TYPE FLUID CLUTCH
Filed April 18, 1944  3 Sheets-Sheet 1
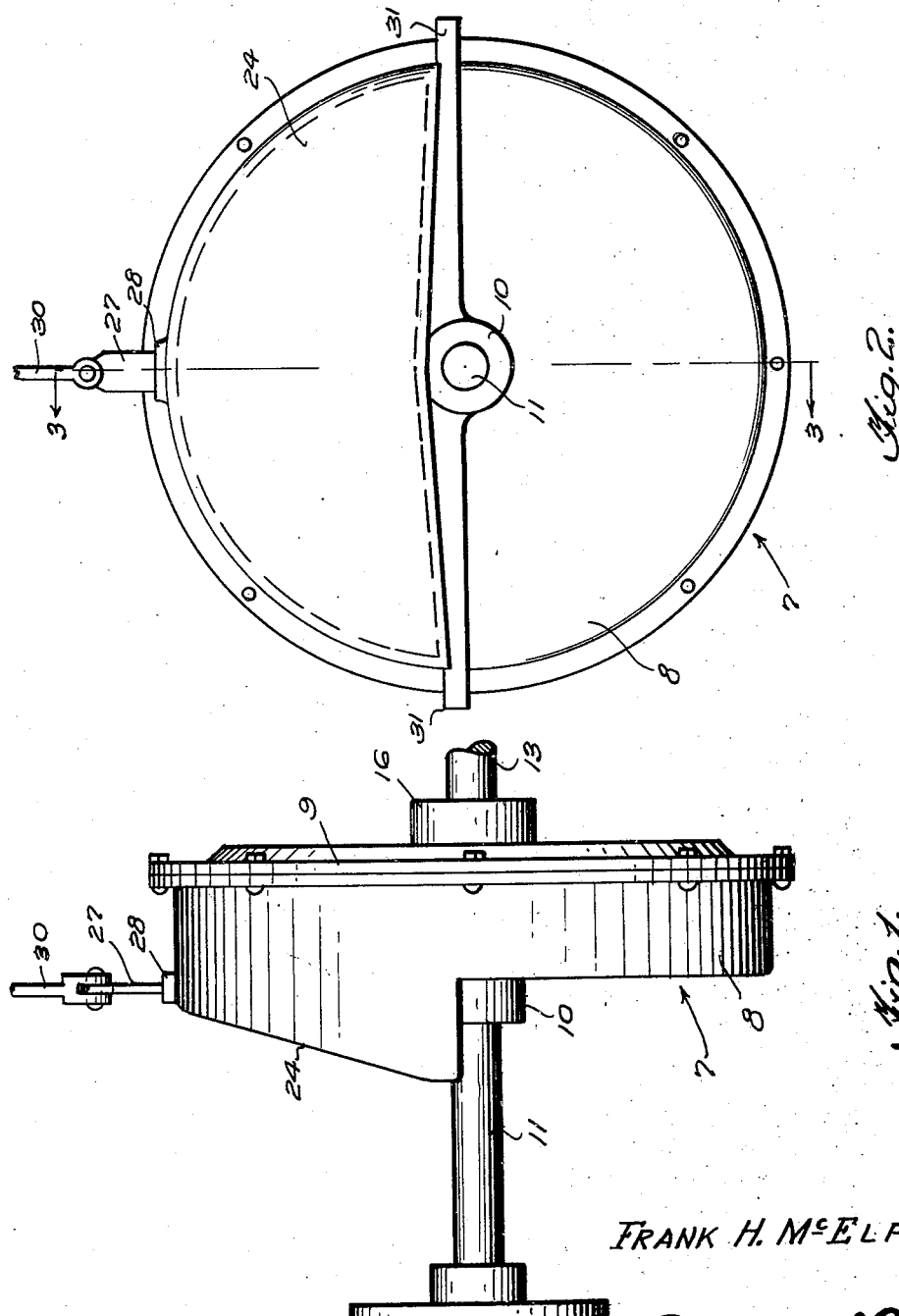
Inventor
FRANK H. McELROY,
By (signatures)
Attorneys Oct. 8, 1946.  F. H. McELROY  2,408,988
CENTRIFUGAL TYPE FLUID CLUTCH
Filed April 18, 1944  3 Sheets-Sheet 2

Inventor
FRANK H. McELROY,

By *Clarence A. O'Brien
and Harvey B. Jackson*
Attorneys

Oct. 8, 1946.　　　　F. H. McELROY　　　2,408,988
CENTRIFUGAL TYPE FLUID CLUTCH
Filed April 18, 1944　　　3 Sheets-Sheet 3

Inventor

FRANK H. McELROY,

By Clarence A. O'Brien
and Harvey B. Jacobson
Attorneys

Patented Oct. 8, 1946

2,408,988

UNITED STATES PATENT OFFICE 2,408,988

CENTRIFUGAL TYPE FLUID CLUTCH

Frank H. McElroy, Jersey Shore, Pa.

Application April 18, 1944, Serial No. 531,633

1 Claim. (Cl. 192—58)

This invention relates to fluid clutches, fluid couplings and similar motion transmitting devices used for coupling and driving axial driving and driven shafts such as are used in automobiles and the like equipped with fluid drives.

More specifically, the invention relates to a novel and improved fluid coupling this through the medium of an improved mechanical association and adaptation of appropriate elements, there being a novel vane-equipped impeller on the driving shaft and this coacting with a bladed power take-off rotor on the driven shaft.

More specifically, in carrying out the principles of the invention I employ a casing in which the driving shaft is mounted for rotation, this being provided with an especially designed impeller which takes the fluid in at the hub or central portion and discharges the same by centrifugal force from the outer peripheral portion to thus actuate a relatively rotatable bladed rotor on the driven shaft and also in the casing, said casing including a trapping, circulating and return chamber for the convenient transfer and circulation of the fluid agent.

Other features and advantages will become more readily apparent from the following description and the accompanying illustrative drawings.

In the drawings—

Figure 1 is an edge, that is, marginal edge elevational view of a fluid clutch or torque convertor constructed in accordance with the principles of the instant invention.

Figure 2 is a face elevational view thereof observing the same in a direction from left to right in Figure 1.

Figure 4:
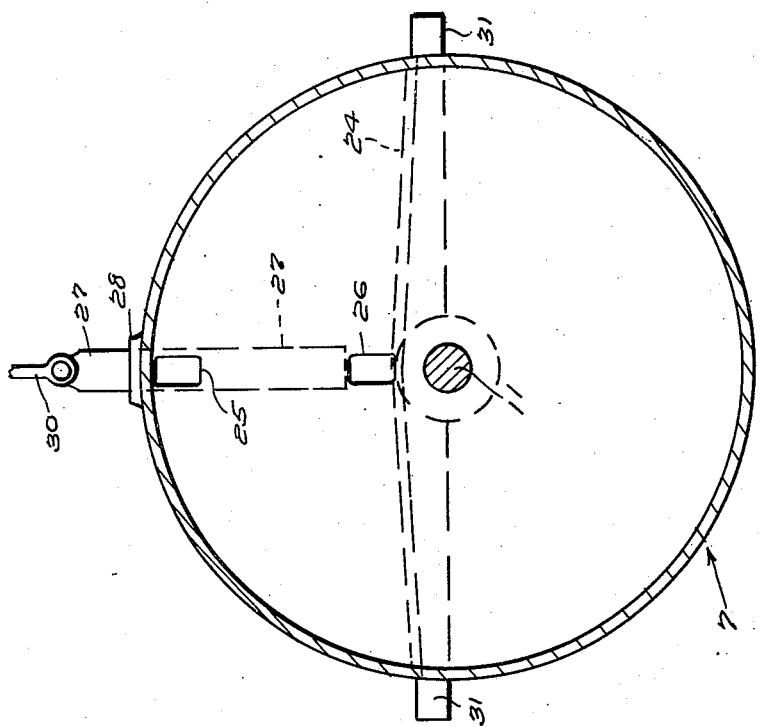
Figure 3:
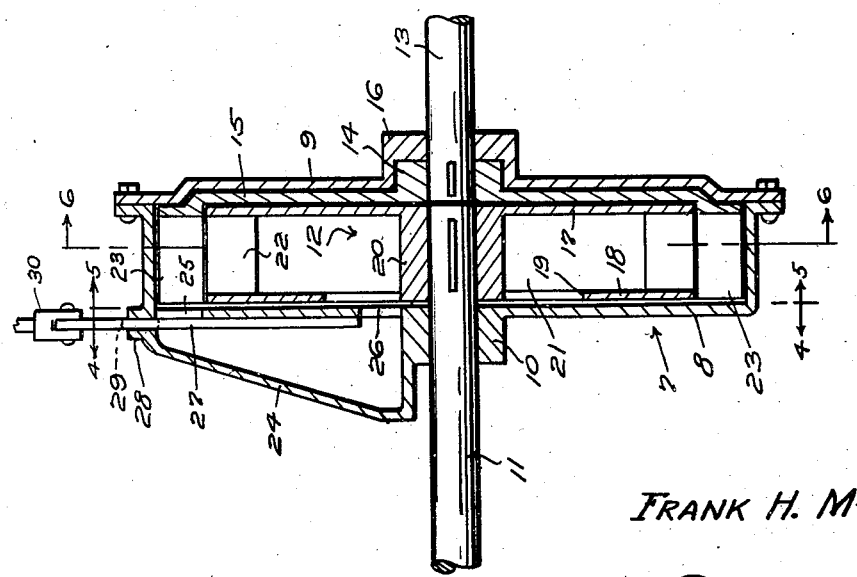
Figure 3 is a central vertical section on the plane of the line 3—3 of Figure 2.
Figure 5:
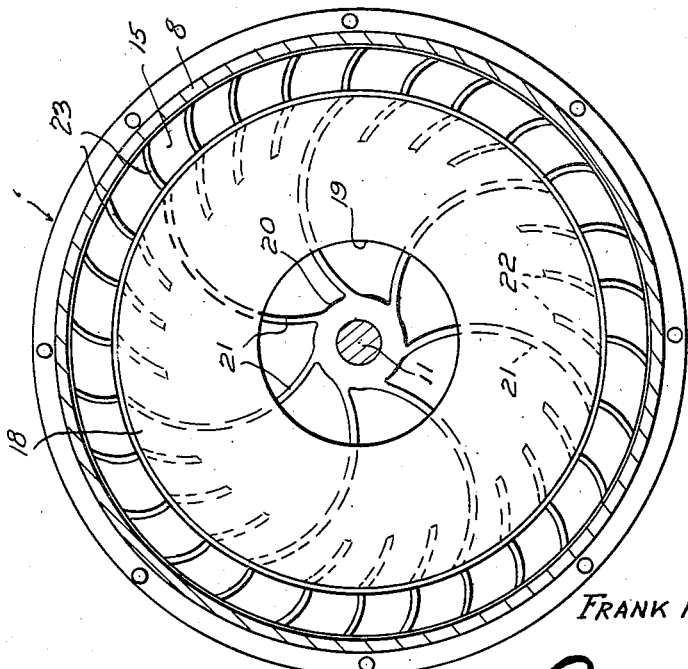

Figures 4 and 5 are sections on the lines 4—4 and 5—5, respectively, of Figure 3, looking in the direction of the respective sets of arrows.

Figure 6:
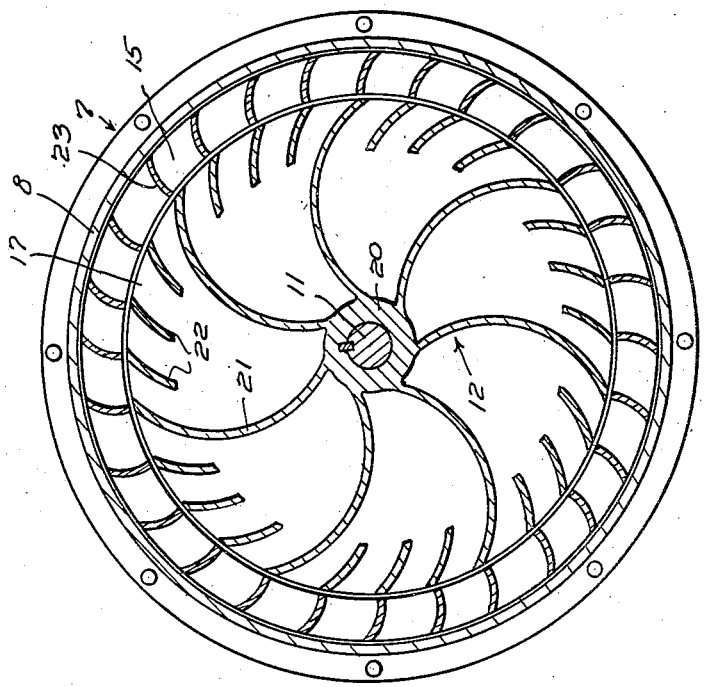

Figure 6 is a similar sectional view taken at a different point, this on the line 6—6 of Figure 3, looking in the direction of the arrows.

The circular casing or housing is generally denoted by the numeral 7 and comprises a main body or shell portion 8 with a removable lid or cover 9. The body portion 8 is provided with a central hub-like bearing 10 for the driving shaft 11, said driving shaft, as before indicated, being provided with an impeller 12 suitably keyed thereon. The axially aligned driven shaft 13 has the hub portion 14 of the bladed disk-like rotor 15 connected thereto. The hub is in effect a journal and is journaled for rotation in the bearing 16 in said cover plate. This also serves as a bearing for the driven shaft 13.

The impeller 12 comprises a solid or imperforate disk 17, and an opposed parallel annulus 18 whose inner peripheral or perimeter edge portion 19 surrounds the hub 20 to serve as a fluid intake entrance. These two plates 17 and 18 are connected together by webs. The webs are in effect main vanes 21 and auxiliary vanes 22. The main vanes 21 radiate from the hub toward the outer periphery and define circumferentially spaced pockets in the impeller. The auxiliary vanes 22 are also curved and are arranged in the respective pockets to provide the desired pocketing, trapping and centrifugal effect of the circulating fluid. The rotor comprises a disk 15 whose outer marginal or peripheral edge is provided with laterally directed circumferentially spaced impact and driven blades 23, the latter surrounding the marginal or peripheral portion of the impeller.

Reference being had to Figures 1, 2 and 3, it will be observed that on the left-hand side of the casing 7 there is an integral substantially semi-circular addenda in the form of a fluid trapping and return chamber 24. This preferably tapers outwardly from the hub toward the peripheral portion where it is suitably narrowed down at the intake end. The fluid is discharged into this chamber by way of the exhaust port 25. It is then returned into the casing 7 by way of the intake port 26. A valve 27 controls the action. The valve is a slide element operating through a guide 28 and having a port 29 for registration with the port 25. Any suitable actuating device 30 is employed for timing and operating the valve. When the port 26 is open, the port 25 is closed and vice versa.

The extensions indicated at 31 in Figures 2 and 4 for example are merely supports for appropriately suspending the device, as a unit, in the automobile chassis or other place of usage.

The impeller unit receives the motion transmitting fluid at the center where it acts on the main vanes and then the auxiliary marginal vanes, said fluid being thrown forcibly by centrifugal action against the blades on the bladed rotor. This, therefore, transfers the motion from the impeller to the driven shaft by way of the bladed rotor. The fluid is properly circulated in a regulated transfer route, this by way of the trapping chamber and valving means for the exhaust and intake ports.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A fluid motion transmitting clutch of the class described comprising a casing having central aligned bearings, a driving shaft mounted for rotation in one of said bearings and protruding into said casing, an impeller mounted on the protruding end and confined for rotation in said casing, a driven shaft mounted for rotation in the remaining bearing, a rotor keyed on said driven shaft and also confined in said casing, said rotor having marginally arranged lateral blades circumferentially spaced around the marginal portion of said impeller, said impeller having a central fluid entrance at its hub portion, said casing being provided with inner and outer selectively usable ports, the outer port constituting an exhaust and the inner port an inlet, a side chamber on said casing housing said ports, said chamber constituting a fluid trap and return unit and being provided with an outer marginal valve guide, and a reciprocatory slide valve mounted in said guide and having a port therein, said valve serving to alternately open and close the intake and exhaust ports in proper timed relation in respect to the relative actions of the impeller and rotor.

FRANK H. McELROY.